US008390558B2

(12) United States Patent
Lee et al.

(10) Patent No.: US 8,390,558 B2

(45) Date of Patent: Mar. 5, 2013

(54) LIQUID CRYSTAL DISPLAY

(75) Inventors: Yong-Duk Lee, Gyeonggi-Do (KR); Young-Min Cho, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 691 days.

(21) Appl. No.: 12/543,009

(22) Filed: Aug. 18, 2009

(65) Prior Publication Data

US 2010/0091000 A1 Apr. 15, 2010

(30) Foreign Application Priority Data

Oct. 9, 2008 (KR) ........................ 10-2008-0099208

(51) Int. Cl.
*G09G 3/36* (2006.01)
*G06F 3/038* (2006.01)
*G09G 5/00* (2006.01)

(52) U.S. Cl. .......................................... 345/99; 345/204

(58) Field of Classification Search ............ 345/84–104, 345/204–215, 690–699
See application file for complete search history.

(56) References Cited

U.S. PATENT DOCUMENTS

| | | | | |
|---|---|---|---|---|
| 4,536,667 A * | 8/1985 | Masuda | ........................ | 327/143 |
| 6,812,911 B2 * | 11/2004 | Makishima et al. | ............ | 345/92 |

* cited by examiner

*Primary Examiner* — Alexander Eisen
*Assistant Examiner* — Patrick F Marinelli
(74) *Attorney, Agent, or Firm* — Morgan, Lewis & Bockius LLP

(57) ABSTRACT

A liquid crystal display (LCD) device includes: a liquid crystal panel including gate lines and data lines crossing to define a plurality of pixels; a timing controller for generating a gate control signal and a data control signal for driving each pixel by using signals inputted from a system and realigning pixel data from the system to output the same; a gate driver for driving the gate lines by using the gate control signal; a data driver for supplying pixel data to a corresponding data line according to the gate control signal; and a reset signal generating unit for generating a reset signal upon receiving input power from the system, and supplying the reset signal to the timing controller, wherein the reset signal generating unit includes: a first resistor connected to an input power input terminal to which input power is applied from the system; a Zener diode having a cathode connected to the first resistor and forming a first node between the cathode and the first resistor; a second resistor connected between an anode of the Zener diode and a reset signal output terminal; a third resistor connected between the reset signal output terminal and a ground; and a capacitor connected between the first node and a ground.

5 Claims, 3 Drawing Sheets

LIQUID CRYSTAL DISPLAY

BACKGROUND OF THE INVENTION

1. Field of the Invention

The present invention relates to a liquid crystal display (LCD) device and, more particularly, to an LCD device capable of easily controlling a sequence of a driving voltage and a reset signal supplied to a timing controller and easily removing an induced voltage, which is to be applied to the timing controller, applied to a reset circuit.

2. Description of the Related Art

In general, the application coverage of a liquid crystal display (LCD) extends because of its characteristics that it is lighter, thinner, and driven at a low power consumption. Thus, the LCD is commonly used as a means for displaying images in mobile computers, mobile phones, office automation equipment, or the like.

The LCD displays a desired image on its screen by controlling the amount of transmission of light according to a video signal applied to a plurality of control switching elements arranged in a matrix form.

The LCD includes a liquid crystal panel including a color filter substrate, an upper substrate, and a thin film transistor (TFT) substrate, a lower substrate, which face, between which and a liquid crystal layer is formed, and a driver that supplies a scan signal and image information to the liquid crystal panel to operate the liquid crystal panel.

The related art LCD will now be described with reference to the accompanying drawings.

As shown in FIG. 1, the related art LCD includes a liquid crystal panel including a thin film transistor (TFT) array substrate 1 with gate lines GL1~GLn and data lines DL1~DLn crossing to define a plurality of pixels, and a driving unit for driving the liquid crystal panel.

The driving unit includes a timing controller 2, a gate driver 4, a data driver 3, and a driving voltage generating unit 7.

The timing controller 2 generates a gate control signal and a data control signal for driving each pixel by using signals inputted from a system 6, realigns pixel data from the system 6, and outputs the same.

The gate driver 4 drives the gate lines GL1~GLn by using the gate control signal supplied from the timing controller 2, and the data driver 3 supplies pixel data to the corresponding data lines DL1~DLm according to the data control signal supplied from the timing controller 2.

Although not shown, the driving voltage generating unit 7 includes a boosting unit (not shown) for converting input power VIN supplied from the system 6 into a certain level of input voltage VIN' (e.g., 3V to 5V) and outputting the same; and a DC/DC converter (not shown) for generating various types of voltages to be used at the timing controller 2, the gate driver 4, and the data driver 3 by using the input voltage VIN' from the boosting unit. Here, the input power VIN is obtained by converting an AC voltage of 110V or 220V supplied to the system from the exterior into a certain level of DC voltage through an AC/DC converter (not shown). Generally, the input power VIN has a level of 12V.

With reference to FIG. 1, the general LCD includes a reset signal generating unit 5 that generates a reset signal VRST for initializing a circuit operation at an early stage of operation, and supplies it to the timing controller 2.

FIG. 2 shows a detailed circuit diagram of the reset signal generating unit 5. As shown in FIG. 2, the reset signal generating unit 5 includes a transistor Q including an emitter connected to a driving voltage VCC input terminal to constitute a first node n1, a base constituting a second node n2, and a collector constituting a third node n3; a first resistor R1 connected between the first node n1 and the second node n2, a second resistor R2 connected between the second node n2 and a ground, a third resistor R3 connected between the third node n3 and the ground, and a fourth resistor R4 connected between the third node n3 and the reset signal (VRST) output terminal; and a capacitor C1 connected between the reset (VRST) output terminal and the ground. Here, the voltage supplied from the DC/DC converter (not shown) of the driving voltage generating unit 7 to the driving voltage (VCC) input terminal is the same as the driving voltage VCC supplied from the DC/DC converter to the timing controller 2.

The driving of the reset signal generating unit 5 having such circuit configuration will now be described.

First, when the input power VIN, basic power, for driving the entire LCD is applied to the driving voltage generating unit 7, the input power VIN is converted into the input voltage VIN' by the boosting unit (not shown) of the driving voltage generating unit 7, and the input voltage VIN' is converted into the driving voltage VCC by the DC/DC converter (not shown) of the driving voltage generating unit 7 and outputted. The driving voltage VCC is supplied to the timing controller 2 and, at the same time, applied to the driving voltage VCC input terminal of the reset signal generating unit 5. Here, the driving voltage VCC is generally 3.3V.

Accordingly, the voltage of the second node n2 has a level previously designed by a voltage distribution rule according to a ratio of the resistance value of the first resistor R1 and that of the second resistor R2, and the transistor Q is turned on by the voltage of the second node n2.

Thus, the voltage of the third node n3 has the same level as the driving voltage VCC of the driving voltage (VCC) input terminal, and the reset signal VRST is outputted via the reset signal VRST output terminal after an RC delay by the fourth resistor R4 and the capacitor C1.

Namely, the reset signal generating unit 5 generating the reset VRST signal upon simultaneously receiving the driving voltage VCC supplied from the DC/DC converter (not shown) of the driving voltage generating unit 7 to the timing controller 2. In this case, however, the sequence of the reset signal VRST is sufficiently behind the driving voltage VCC due to the RC delay by the fourth resistor R4 and the capacitor C1. Thus, the timing controller 2 receives the reset signal VRST after the driving voltage VCC is applied from the DC/DC converter (not shown) of the driving voltage generating unit 7, so the elements within the timing controller 2 are initialized.

However, the reset signal generating unit 5 is designed to have a sufficiently high RC delay due to the fourth resistor R4 and the capacitor C1 in order to make the reset signal VRST to be sufficiently behind in sequence than the driving voltage VCC. At this time, however, a voltage level rising time of the reset signal VRST is lengthened, so the internal elements of the timing controller 2 cannot recognize the reset signal VRST from the reset signal generating unit 5 as a signal for initialization. Namely, the timing controller 2 is not initialized.

Also, in the related art general LCD, the induced voltage applied to the timing controller 2 is applied to the reset signal (VRST) output terminal of the reset signal generating unit 5, there is no path for removing the induced voltage.

In addition, in the related art general LCD, the transistor Q, namely, the bipolar junction transistor (BJT), a major element of the reset signal generating unit 5 has much deviation over temperature, so there is a high possibility that an error occurs in generating the reset signal (VRST).

SUMMARY OF THE INVENTION

Therefore, in order to address the above matters, the various features described herein have been conceived. One aspect of the exemplary embodiments is to provide a liquid crystal display (LCD) device including a reset signal generating unit, in which a voltage level of a reset signal supplied from a reset signal generating unit to a timing controller rises within a short time, an induced voltage, which is to be applied to the timing controller, applied to a reset signal output terminal of the reset signal generating unit can be removed, and there is no operation error according to temperature by not having a bipolar juncture transistor (BJT).

This specification provides a liquid crystal display (LCD) device including: a liquid crystal panel including gate lines and data lines crossing to define a plurality of pixels; a timing controller for generating a gate control signal and a data control signal for driving each pixel by using signals inputted from a system and realigning pixel data from the system to output the same; a gate driver for driving the gate lines by using the gate control signal; a data driver for supplying pixel data to a corresponding data line according to the gate control signal; and a reset signal generating unit for generating a reset signal upon receiving input power from the system, and supplying the reset signal to the timing controller, wherein the reset signal generating unit includes: a first resistor connected to an input power input terminal to which input power is applied from the system; a Zener diode having a cathode connected to the first resistor and forming a first node between the cathode and the first resistor; a second resistor connected between an anode of the Zener diode and a reset signal output terminal; a third resistor connected between the reset signal output terminal and a ground; and a capacitor connected between the first node and a ground.

The foregoing and other objects, features, aspects and advantages of the present invention will become more apparent from the following detailed description of the present invention when taken in conjunction with the accompanying drawings.

DETAILED DESCRIPTION OF THE INVENTION

A liquid crystal display (LCD) device according to embodiments of the present invention will now be described in detail with reference to the accompanying drawings.

Figure 1:
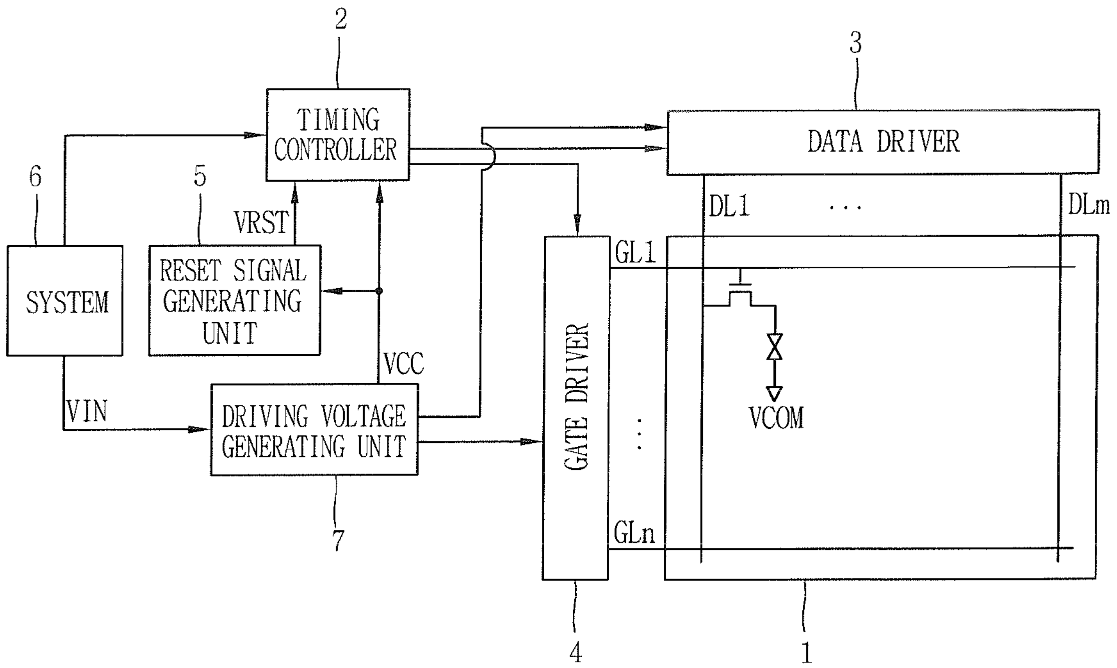
FIG. 1 RELATED ART
FIG. 1 is a block diagram showing a general liquid crystal display (LCD) device.
Figure 2:
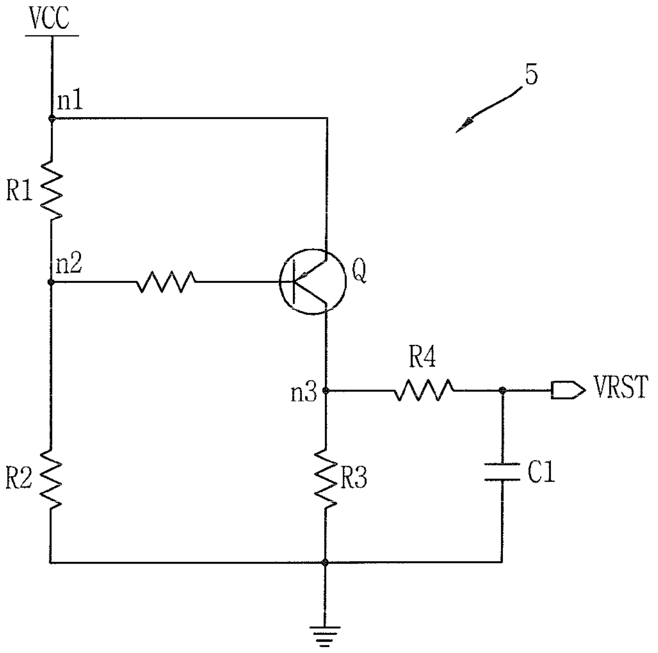
FIG. 2 RELATED ART
FIG. 2 is a circuit diagram of a reset signal generating unit of FIG. 1.
Figure 3:
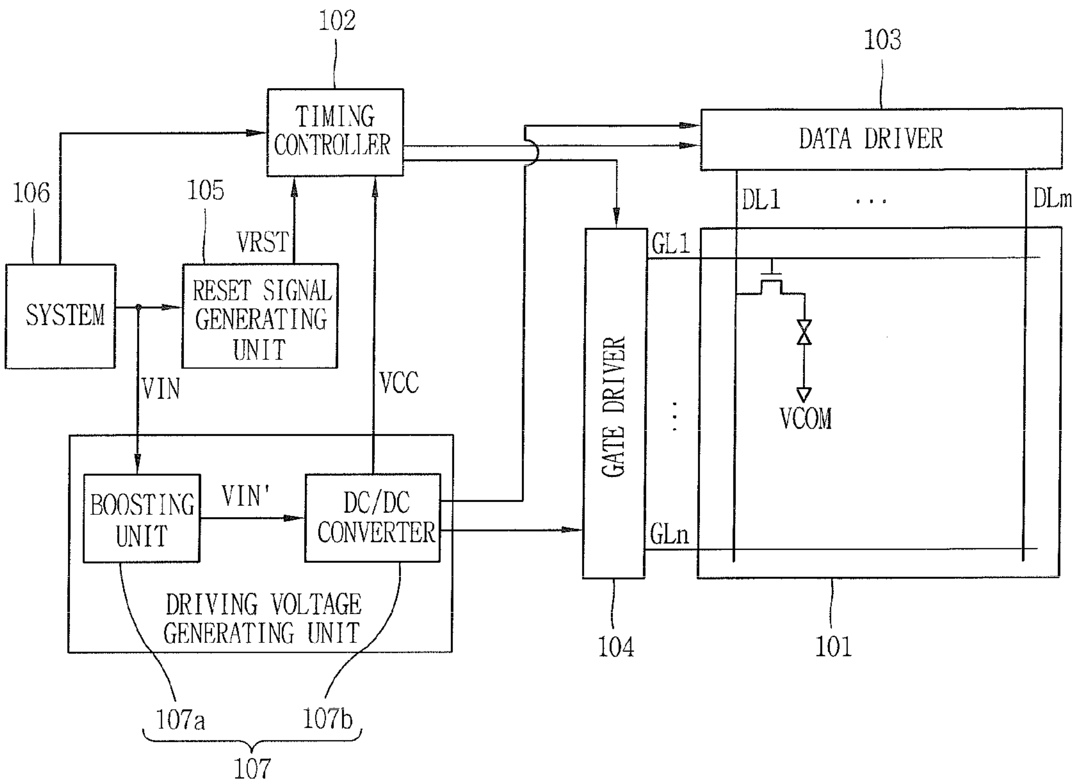
FIG. 3 is a block diagram showing an LCD device according to an embodiment of the present invention.
Figure 4:
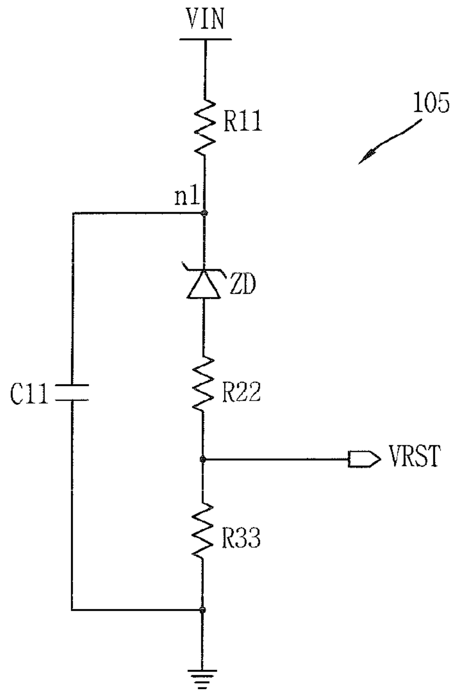
FIG. 4 is a circuit diagram of a reset signal generating unit of FIG. 3.

As shown in FIGS. 3 and 4, the LCD device includes: a liquid crystal panel including gate lines (GL1~GLn) and data lines (DL1~DLm) crossing to define a plurality of pixels; a timing controller 102 for generating a gate control signal and a data control signal for driving each pixel by using signals inputted from a system 106 and realigning pixel data from the system 106 to output the same; a gate driver 104 for driving the gate lines GL1~GLn by using the gate control signal; a data driver 103 for supplying pixel data to a corresponding data line DL1~DLm according to the gate control signal; and a reset signal generating unit 105 for generating a reset signal VRST upon receiving input power VIN from the system 106, and supplying the reset signal to the timing controller 102.

The reset signal generating unit 105 includes: a first resistor R11 connected to an input power VIN input terminal to which input power VIN is applied from the system 106; a Zener diode ZD having a cathode connected to the first resistor R11 and forming a first node n1 between the cathode and the first resistor R11; a second resistor R22 connected between an anode of the Zener diode ZD and a reset signal VRST output terminal; a third resistor R33 connected between the reset signal VRST output terminal and a ground; and a capacitor C11 connected between the first node n1 and a ground.

The elements of the LCD according to an embodiment of the present invention will now be described in detail.

The LCD according to an embodiment of the present invention includes a liquid crystal panel including a first substrate 101, a thin film transistor (TFT) array substrate, and a second substrate (not shown), a color filter substrate, and liquid crystal (not shown) is interposed between the first and second substrates 101 and 102.

The first substrate 101 includes a plurality of pixels defined as a plurality of gate lines GL1~GLn and a plurality of data lines DL1~DLm cross each other.

A TFT is formed at each crossing of the gate lines GL1~GLn and the data lines DL1~DLm of each pixel, and a pixel electrode is formed to be connected to the TFT.

Although not shown, a common electrode to which a common voltage is applied is formed on the second substrate (not shown). The common voltage supplied to the common electrode form a vertical field together with a pixel signal supplied to the pixel electrode to drive liquid crystal. The formation of the common electrode on the second substrate is merely illustrative for the sake of brevity. That is, the common electrode may be formed on the first substrate 101 and a common voltage applied to the common electrode may form an in-plane field (horizontal field) together with a pixel signal applied to the pixel electrode to drive liquid crystal.

With reference to FIG. 3, the LCD according to the embodiment of the present invention includes various driving units such as a timing controller 102 for driving pixels of the first substrate 101, a gate driver 104, a data driver 103, and a driving voltage generating unit 107.

The timing controller 102 generates a gate control signal for controlling the gate driver 104 and a data control signal for controlling the data driver 103 by using signals inputted from the system 106, realigns pixel data from the exterior, and supplies the pixel data to the data driver 103.

The gate control signal includes a gate start pulse (GSP) signal, a gate shift clock (GSC) signal, a gate output enable (GOE) signal, and the like, and the data control signal includes a source start pulse (SSP) signal, a source shift clock (SSC) signal, a source output enable (SOE) signal, a polarity (POL) control signal, and the like.

The gate driver 104 shifts the gate start pulse (GSP) received from the timing controller 102 according to a gate shift clock (GSC) and sequentially supplies a gate ON signal to the gate lines GL1~GLn to turn on TFTs connected to the corresponding gate lines GL1~GLn. While the gate ON signal is not supplied to the gate lines GL1~GLn, the gate driver 104 supplies a gate OFF signal.

The data driver 103 shifts the source start pulse (SSP) received from the timing controller 102 according to the source shift clock (SSC) to generate a sampling signal, sequentially inputs the pixel data by certain units in response to the sampling signal and latches the pixel data, converts the latched pixel data of a single horizontal pixel row into an analog pixel signal, and supplies the analog pixel signal to the data lines DL1~DLm. Accordingly, the pixel signal is supplied to the pixel electrode connected to the TFT which has been turned by the gate ON signal.

With reference to FIG. 3, the driving voltage generating unit 107 includes a boosting unit 107*a* for converting input power VIN supplied from the system 106 into an input voltage VIN' of a lower level than the input power VIN and outputting the same; and a DC/DC converter 107*b* for generating various types of voltages to be used for the timing controller 102, the gate driver 104 and the data driver 103. Here, the input power VIN is obtained by converting an AC voltage of 110V or 220V supplied to the system 106 from the exterior into a certain level of DC voltage through an AC/DC converter (not shown). Generally, the input power VIN has a level of 12V.

With reference to FIG. 3, the reset signal generating unit 105 receives the input power VIN from the system 106, generates the reset signal VRST, and supplies to the timing controller 102.

The reset signal generating unit 105 will now be described with reference to FIGS. 4 and 5.

With reference to FIG. 4, the reset signal generating unit 105 includes: a first resistor R11 connected to an input power VIN input terminal to which input power VIN is applied from the system 106; a Zener diode ZD having a cathode connected to the first resistor R11 and forming a first node n1 between the cathode and the first resistor R11; a second resistor R22 connected between an anode of the Zener diode ZD and a reset signal VRST output terminal; a third resistor R33 connected between the reset signal VRST output terminal and a ground; and a capacitor C11 connected between the first node n1 and a ground.

In the reset signal generating unit 105 having such configuration, the Zener diode ZD is employed with a breakdown voltage of 5.6V or higher. If the Zener diode ZD has a breakdown voltage lower than 5.6V, a leakage current would increase to cause an error in the operation of the reset signal generating unit 105.

In order to drive the Zener diode ZD having the breakdown voltage of 5.6V or higher, the voltage applied to the Zener diode ZD is preferably higher than the breakdown voltage of the Zener diode. In this respect, however, the driving voltage VCC supplied from the DC/DC converter 107*b* to the timing controller 102 generally has a level of 3.3V, not suitable. Thus, the reset signal generating unit 150 uses the driving power VIN of 12V supplied from the system.

The operation of the reset signal generating unit 105 will now be described with reference to FIGS. 4 and 5.

Figure 5:
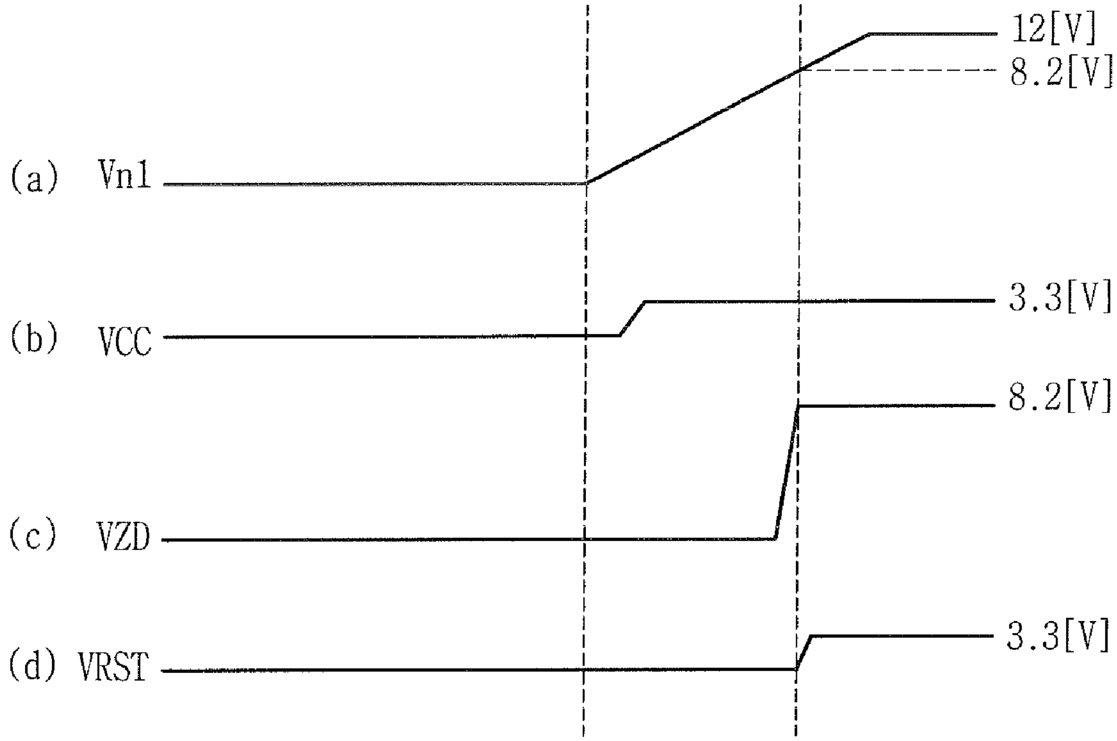
FIG. 5 is a waveform view in which (a) shows a change in voltage of a first node over time; (b) shows a change in voltage supplied from a DC/DC converter to a timing controller over time; (c) shows a change in voltage at both ends of a Zener diode over time; and (d) shows a change in a reset signal over time.

For reference, a voltage waveform (a) in FIG. 5 shows a change in voltage at the first node n1 over time, and a voltage waveform (b) shows a change in voltage supplied from the DC/DC converter 107*b* to the timing controller 102 over time; voltage waveform (c) shows a change in voltage at both ends of the Zener diode ZD over time; and voltage waveform (d) shows a change in a reset signal over time.

In describing the operation of the reset signal generating unit 105, it is assumed that the input power VIN is 12V, the input voltage VIN' is 3V to 5V, and the driving voltage VCC is 3.3V. But this is based on the general theory, and the input power VIN, the input voltage VIN' and the driving voltage VCC may have other levels than the mentioned ones.

In describing the operation of the reset signal generating unit 105, it is assumed that the breakdown voltage of the Zener diode is 8.2V. But it is for the sake of explanation, and the Zener diode ZD, an element of the reset signal generating unit 105, may have any other voltage level than 8.2V so long as it has a breakdown voltage of 5.6V or higher. In this case, of course, the breakdown voltage has a level lower than the input power VIN applied to the input power VIN input terminal.

With reference to FIGS. 4 and 5, when the input power VIN 12V, basic power for driving the LCD overall, is applied to the driving voltage generating unit 107 and the reset signal generating unit 105, the boosting unit 107*a* of the driving voltage generating unit 107 covnerts the input power VIN 12V into an input voltage VIN' of 3V to 5V and supplies the same to the DC/DC converter 107*b*. The DC/DC voltage 107*b* covnerts the input voltage VIN' of 3V to 3V into a driving voltage VCC of 3.3V and supplies the same to the timing controller 102. Input power VIN of 12V is applied to the input power VIN input terminal of the reset signal generating unit 105, making an RC delay by the first resistor R11 and the capacitor C11, and accordingly, the voltage of the first node n1 is gradually increased to close to 12V, the same level as the driving voltage VCC. The Zener diode (ZD) starts to operate at the moment when the voltage at the first node n1 closes to 8.2V in the process of gradually increasing to 12V, and at this time, the voltage VZD at both ends of the Zener diode is rapidly increased up to 8.2V, and accordingly, a reset voltage VRST of 3.3V is outputted to the timing controller 102 via the reset signal VRST output terminal. Here, the level of the reset voltage VRST has been previously set according to a voltage distribution rule based on a ratio of the resistance value of the second resistor R22 and that of the third resistor R33. The resistance value of the second resistor R22 and that of the third resistor R33 may be variably set so long as it can generate the reset signal VRST of 3.3V within the scope of the present invention.

In the reset signal generating unit 105 according to an embodiment of the present invention, because a time point at which the reset signal VRST is supplied to the timing controller 102 is sufficiently behind a time point at which the driving voltage VCC is supplied to the timing controller 102 due to the RC delay by the first resistor R11 and the capacitor C11, the timing controller 102 can be stably driven. In this case, the reset signal generating unit 105 controls the sequence of the reset signal VRST according to the RC delay by the first resistor R11 and the capacitor C11, but because the voltage level rising time of the reset signal VRST is short because of the RC delay, the timing controller 102 recognizes it as a signal for initialization to perform initialization.

The reset signal generating unit 105 does not employ a bipolar juncture transistor with a severe deviation over temperature, so there is no operation error according to temperature, and thus, the fabrication cost of the LCD device can be reduced.

In addition, in the reset signal generating unit 105, although the induced voltage applied to the timing controller 102 is applied to the reset signal VRST output terminal of the reset signal generating unit 105, it is leaked to the input power VIN input terminal via the Zener diode. Thus, there occurs no error possibly caused by the induced voltage when the reset signal generating unit 105 generates the reset signal VRST.

Therefore, with the reset signal generating unit 105, the LCD according to the embodiment of the present invention can improve picture quality of a screen.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device, comprising:

a liquid crystal panel including gate lines and data lines crossing to define a plurality of pixels;

a timing controller for generating a gate control signal and a data control signal for driving each pixel by using signals inputted from a system and realigning pixel data from the system to output the same;

a gate driver for driving the gate lines by using the gate control signal;

a data driver for supplying pixel data to a corresponding data line according to the gate control signal;

a driving voltage generating unit for generating a plurality of voltages to be used for the timing controller, the gate driver and the data driver by using input power supplied from the system; and a reset signal generating unit for generating a reset signal upon receiving the input power from the system, and supplying the reset signal to the timing controller, wherein the reset signal generating unit comprises:

a first resistor connected to an input power input terminal to which the input power is applied from the system, a Zener diode having a cathode connected to the first resistor and forming a first node between the cathode and the first resistor, a second resistor connected between an anode of the Zener diode and a reset signal output terminal, a third resistor connected between the reset signal output terminal and a ground, and a capacitor connected between the first node and a ground, and wherein the driving voltage generating unit supplies a driving voltage to the timing controller, and wherein, in response to the input power being applied to the input power input terminal, the first resistor and the capacitor of the reset signal generating unit delays a voltage at the first node to make a time point at which the reset signal, that is supplied to the timing controller, is behind a time point at which the driving voltage is inputted to the timing controller.

2. The device of claim 1, wherein the Zener diode has a breakdown voltage of 5.6V or higher.

3. The device of claim 1, wherein the Zener diode has a breakdown voltage of 8.2V or higher.

4. The device of claim 1, wherein the input power supplied from the system to the reset signal generating unit has at least the same level of voltage as that of the breakdown voltage of the Zener diode.

5. The device of claim 1, wherein the voltage level of the reset signal is set according to a voltage distribution by resistance values of the second and third resistors.

* * * * *